US012546325B2

(12) United States Patent
Lu

(10) Patent No.: US 12,546,325 B2
(45) Date of Patent: Feb. 10, 2026

(54) CURVED BLADE, PREPARATION METHOD THEREOF, AND CENTRIFUGAL IMPELLER COMPRISING THE SAME

(71) Applicant: Zhongshan Yibisi Technology Co., Ltd., Zhongshan (CN)

(72) Inventor: Qiu Lu, Zhongshan (CN)

(73) Assignee: ZHONGSHAN YIBISI TECHNOLOGY CO., LTD., Zhongshan (CN)

( * ) Notice: Subject to any disclaimer, the term of this patent is extended or adjusted under 35 U.S.C. 154(b) by 0 days.

(21) Appl. No.: 18/789,628

(22) Filed: Jul. 30, 2024

(65) Prior Publication Data

US 2025/0043685 A1 Feb. 6, 2025

(30) Foreign Application Priority Data

Jul. 31, 2023 (CN) ......................... 202310948277.6

(51) Int. Cl.
*F04D 17/16* (2006.01)
*B21D 22/02* (2006.01)

(52) U.S. Cl.
CPC ............. *F04D 17/16* (2013.01); *B21D 22/02* (2013.01); *F05D 2230/20* (2013.01); *F05D 2230/54* (2013.01); *F05D 2240/304* (2013.01); *F05D 2240/307* (2013.01); *F05D 2250/71* (2013.01)

(58) Field of Classification Search
CPC ........ F04D 17/16; F04D 29/281; F04D 29/30; F05D 2230/20; F05D 2230/54; F05D 2240/304; F05D 2240/307; F05D 2250/71; B21D 22/02
See application file for complete search history.

(56) References Cited

U.S. PATENT DOCUMENTS

| | | | | |
|---|---|---|---|---|
| 4,664,593 | A * | 5/1987 | Hayashi | F01D 5/20 416/223 R |
| 5,215,441 | A * | 6/1993 | Evans | F01D 5/16 416/223 R |
| 6,796,771 | B2 * | 9/2004 | Suzuki | F04D 29/384 416/235 |
| 6,994,523 | B2 * | 2/2006 | Eguchi | F04D 29/384 416/235 |
| 8,231,343 | B2 * | 7/2012 | Kayama | F04D 29/685 415/220 |
| 8,784,060 | B2 * | 7/2014 | Iwata | F04D 29/282 416/185 |

(Continued)

*Primary Examiner* — Brian P Wolcott
(74) *Attorney, Agent, or Firm* — MATTHIAS SCHOLL P.C.; Matthias Scholl

(57) ABSTRACT

A method for preparing a curved blade of a centrifugal impeller including: providing a primary blade, forming a fold line on the primary blade, and bending a bending region of the primary blade along the fold line towards a rotating axis of the centrifugal impeller. The primary blade includes an inlet edge, an outlet edge, a blade root, and a blade top. The inlet edge is disposed oppositely to the outlet edge; the blade root is disposed oppositely to the blade top; the inlet edge and the outlet edge are each disposed between the blade root and the blade top; and a vertex is defined at a joint of the outlet edge and the blade top. The fold line includes a first point and a second point; the first point is defined on the outlet edge; the second point is defined on the blade top.

10 Claims, 17 Drawing Sheets

(56) References Cited

U.S. PATENT DOCUMENTS

| | | | | |
|---|---|---|---|---|
| 9,995,311 | B2 * | 6/2018 | Son | B21D 11/20 |
| 10,662,968 | B2 * | 5/2020 | Son | B23K 11/16 |
| 10,746,025 | B2 * | 8/2020 | Yoshida | F01D 5/04 |
| 11,015,611 | B2 * | 5/2021 | Xu | F04D 29/023 |
| 11,306,732 | B2 * | 4/2022 | Xu | F04D 29/281 |
| 12,104,604 | B2 * | 10/2024 | Yamazaki | F04D 19/002 |

* cited by examiner

CURVED BLADE, PREPARATION METHOD THEREOF, AND CENTRIFUGAL IMPELLER COMPRISING THE SAME

CROSS REFERENCE TO RELATED APPLICATION

Pursuant to 35 U.S.C. § 119 and the Paris Convention Treaty, this application claims foreign priority to Chinese Patent Application No. 202310948277.6 filed Jul. 31, 2023, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a curved blade, a preparation method thereof, and a centrifugal impeller comprising the same.

As shown in FIG. 1, a conventional backward centrifugal impeller comprises a disk 1*a*, a cover 2*a*, and a plurality of blades 3*a* produced by sheet metal stamping. The stamping technique introduces elasticity into the material of the plurality of blades. The elasticity causes springback, resulting in deviations of the profiles of the plurality of blades from the intended design, as further detailed below.

A blade is a critical part of a centrifugal impeller, and the profile of the blade is a geometric concept that directly influences the operational efficiency of the centrifugal impeller. For instance, in FIG. 2, a cross-section of the blade is obtained by intersecting the centrifugal impeller with a plane perpendicular to a rotating axis. In FIG. 3, numerous inscribed circles are drawn within the cross-section of the blade, and a blade profile (or a median line) is represented by a line connecting the centers of the inscribed circles. The blade is viewed as a plurality of blade profiles stacked vertically, each serving as a fundamental geometric unit of the blade.

In FIG. 4, the geometric parameters of the blade are defined as follows: the air inflow endpoint is the starting point of the blade profile, and the air outflow endpoint is the ending point of the blade profile. Considering the principles of absolute velocity, relative velocity, and tangential velocity in theoretical physics, it is understood that air moves relative to the blade profile within the centrifugal impeller. By employing the earth as a reference for an absolute coordinate system, the absolute velocity vector of the air is decomposed according to the parallelogram law, allowing for clear depiction of the relationships between the starting point, the ending point, and different velocity vectors during airflow. The air velocity vectors at the starting point and the ending point directly influence the magnitude of work done by the blades. At the starting point of the blade profile: C1 is the absolute velocity of the incoming airflow, W1 is the relative velocity of the incoming airflow, and U1 is the tangential velocity, i.e., the circumferential velocity. At the ending point of the blade profile: C2 is the absolute velocity of the outgoing airflow, W2 is the relative velocity of the outgoing airflow, and U2 is the tangential velocity, i.e., the circumferential velocity. Consequently, an angle between W1 and U1 in the reverse direction defines the inlet angle of the blade, while an angle between W2 and U2 in the reverse direction defines the outlet angle of the blade. The blade undergoes springback during sheet metal stamping, causing plastic deformation or separation to create stamped parts with specific shapes, sizes, and properties. Due to the inherent elastic modulus of the sheet metal, internal stress remains in the stamped parts after plastic deformation. Over time, the internal stress is released, causing the sheet metal to revert slightly towards its original state, resulting in the springback. For the blades produced by sheet metal stamping, the minimal plastic deformation leads to significant springback, causing the blade shape to deviate from the intended design.

In FIG. 5, the dashed line represents the intended blade profile, while the solid line shows the profile after springback. Due to springback, the starting point and the ending point of the blade profile shift, leading to a smaller inlet angle and a larger outlet angle macroscopically.

An excessively large outlet angle of the blade increases the workload of the centrifugal impeller beyond the original design range. Although increased workload can benefit the properties of the centrifugal impeller, the input and output power of the motor also increase. If the input and output power exceed the motor limits, a series of problems may arise, such as excessive motor temperature, reduced motor output efficiency, and accelerated component failure, ultimately lowering overall efficiency, operational reliability, and machine lifespan.

Achieving a blade profile close to the intended design requires considering material plasticity, plastic deformation, and multiple die revisions. The revision process relies heavily on experience but still results in some deviations. Predicting exact performance is challenging due to complex interactions between material properties, deformation, and springback, making it hard to guarantee performance alignment in production. Lengthy, partly uncontrollable revisions also impact product delivery schedules.

SUMMARY

To solve the aforesaid problems, the first objective of the disclosure is to provide a method for preparing a curved blade of a centrifugal impeller. The centrifugal impeller is centered around a rotating axis L.

The method comprises:

- S1. providing a primary blade: the primary blade comprises an inlet edge, an outlet edge, a blade root, and a blade top; the inlet edge is disposed oppositely to the outlet edge; the blade root is disposed oppositely to the blade top; the inlet edge and the outlet edge are each disposed between the blade root and the blade top; and a vertex A is defined at a joint of the outlet edge and the blade top;
- S2. forming a fold line GH on the primary blade: the fold line GH comprises a first point G and a second point H; the first point G is defined on the outlet edge; the second point H is defined on the blade top; a first curve GA is formed on the outlet edge between the first point G and the vertex A; a second curve HA is formed on the blade top between the second point H and the vertex A; the first curve GA, the second curve HA, and the fold line GH enclose a bending region AGH; and
- S3. bending the bending region AGH along the fold line GH towards the rotating axis L to form the curved blade.

In a class of this embodiment, in S2, forming the fold line GH comprises:

- S2-1. defining the first point G; obtaining a camber line through the first point G; drawing a first line segment GY' on the tangent of the camber line passing through at the first point G; rotating the first line segment GY' about the first point G within a normal plane of the first curve GA towards the rotating axis L by a first angle f to obtain a second line segment GY, where an endpoint Y' of the first line segment GY' is on one side of the first point G away from the inlet edge;

S2-2. moving the second line segment GY from the first point G to the vertex A, thereby generating a profile M; and S2-3. rotating the profile M about the second line segment GY towards the rotating axis L by a second angle i to intersect with the primary blade to form an intersection curve, referred to as the fold line GH.

In a class of this embodiment, the first angle f is between 3° and 10°.

In a class of this embodiment, the second angle i is between 3° and 6°.

In a class of this embodiment, a length of the first curve GA is less than or equal to half a length of the outlet edge.

In a class of this embodiment, in S3, the bending region AGH is bent along the fold line GA towards the rotating axis L, so as to coincide with the profile M, thereby obtaining the curved blade.

In a class of this embodiment, the fold line GH and the outlet edge are intersected with a plurality of camber lines, forming a plurality of curves VO; and lengths of the curves VO increase from the point G to the vertex A.

In a class of this embodiment, the primary blade is prepared by sheet metal stamping.

The second objective of the disclosure is to provide the curved blade prepared by the method.

The third objective of the disclosure is to provide the centrifugal impeller; and the centrifugal impeller comprises a disk, a cover, and a plurality of the curved blades.

In a class of this embodiment, the plurality of the curved blades are disposed between the disk and the cover; the disk is connected to the blade root of each of the plurality of the curved blades; and the cover is connected to the blade top of each of the plurality of the curved blades.

The following advantages are associated with the disclosure.

1. The method stabilizes the shape of the plurality of primary blades, reducing springback caused by elastic recovery after sheet metal stamping, and minimizing the deviation from the intended blade profile.
2. The method adjusts the parameters of the starting point of the blade profile and reduces the outlet angle of the primary blade to align the outlet airflow angle of the blades with the intended blade profile after springback. The adjustment minimizes the deviation from the intended design specification, preventing the motor input and output from exceeding permissible limits, avoiding detrimental effects such as increased motor temperature, reduced motor output efficiency, and accelerated failure of motor components.
3. The method reduces the number of mold adjustments, saving on manufacturing and mold costs, significantly increasing mold efficiency, reducing uncontrollable factors, and ensuring blade performance and on-time product delivery.

DETAILED DESCRIPTION

To further illustrate the disclosure, embodiments detailing a curved blade, a preparation method thereof, and a centrifugal impeller comprising the curved blade are described below. It should be noted that the following embodiments are intended to describe and not to limit the disclosure.

Referring to FIGS. 6, 7, 8 and 9, a centrifugal impeller of the disclosure comprises a disk 200, a cover 300, and a plurality of curved blades 100; the plurality of curved blades 100 are disposed between the disk 200 and the cover 300; each of the plurality of curved blades 100 comprises a blade root and a blade top; the blade top is disposed oppositely to the blade root; the plurality of curved blades 100 are disposed between the disk 200 and the cover 300; the disk 200 is connected to the blade root of each of the plurality of curved blades 100; and the cover is connected to the blade top of each of the plurality of curved blades 100.

Each of the plurality of curved blades is prepared using the following method:

S10. Preparation of a primary blade 100'

Figure 1:
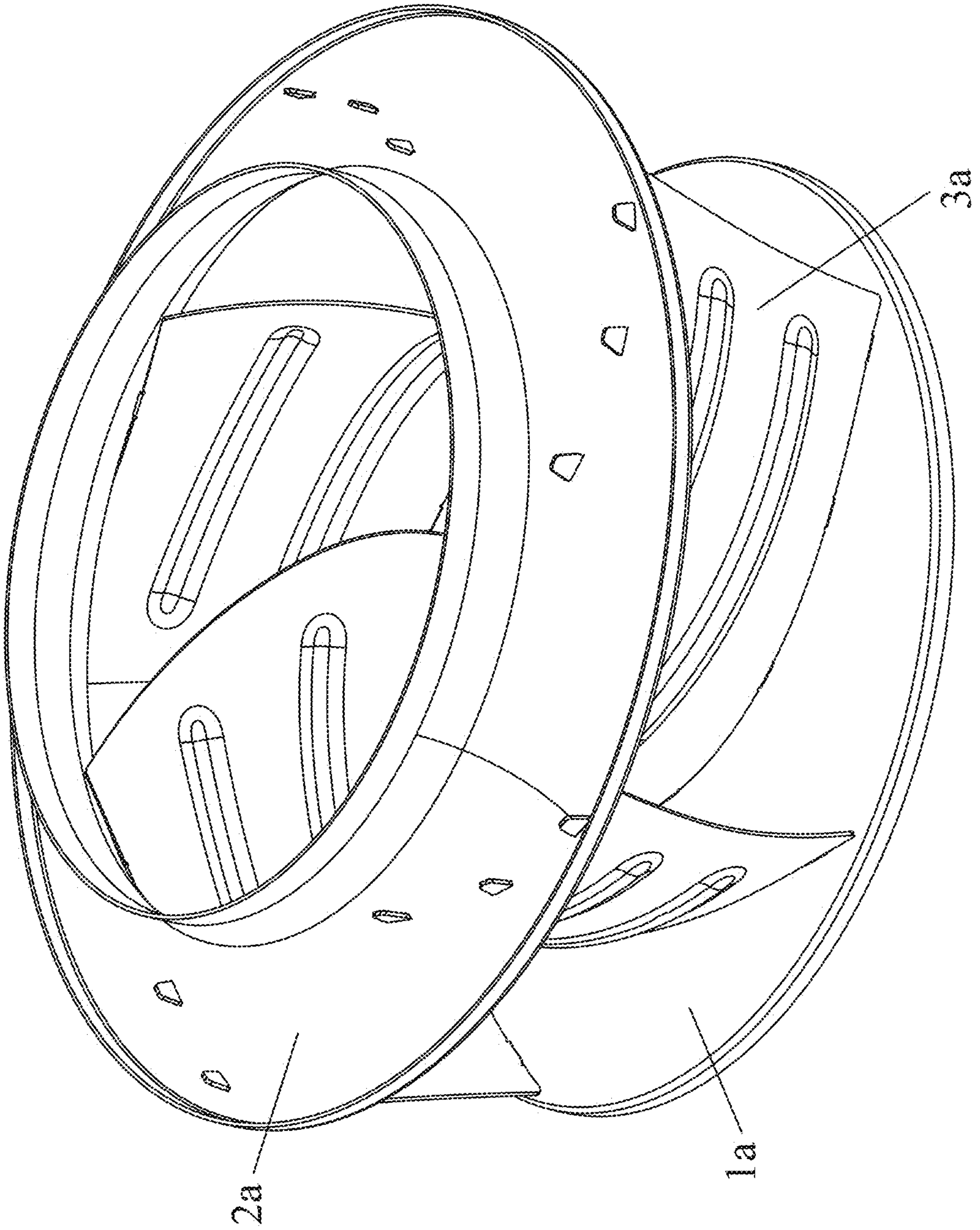
FIG. 1 (Prior art)
FIG. 1 is a perspective view of a conventional impeller.
Figure 2:
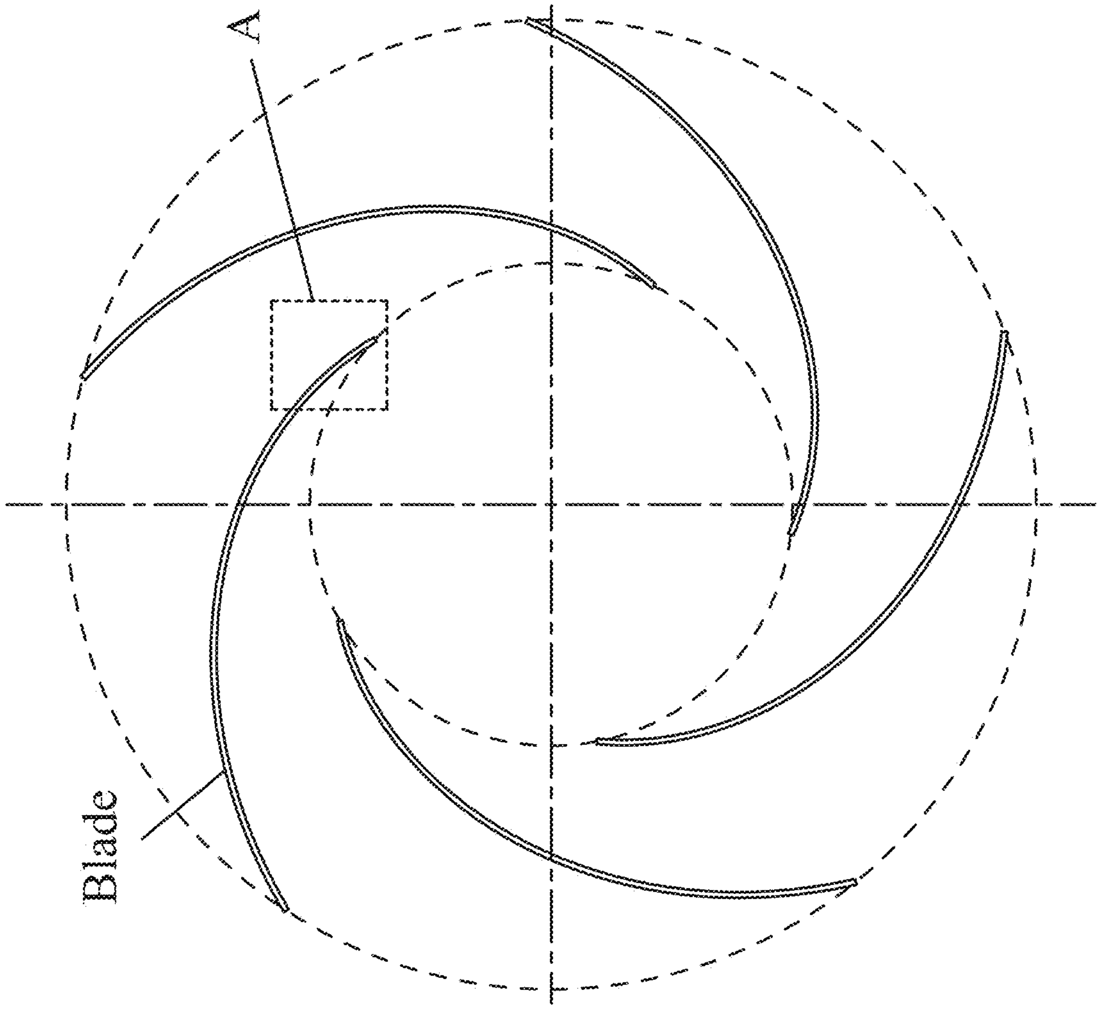
FIG. 2 (Prior art)
FIG. 2 is a cross-sectional view of a conventional impeller taken along a plane perpendicular to a rotating axis.
Figure 3:
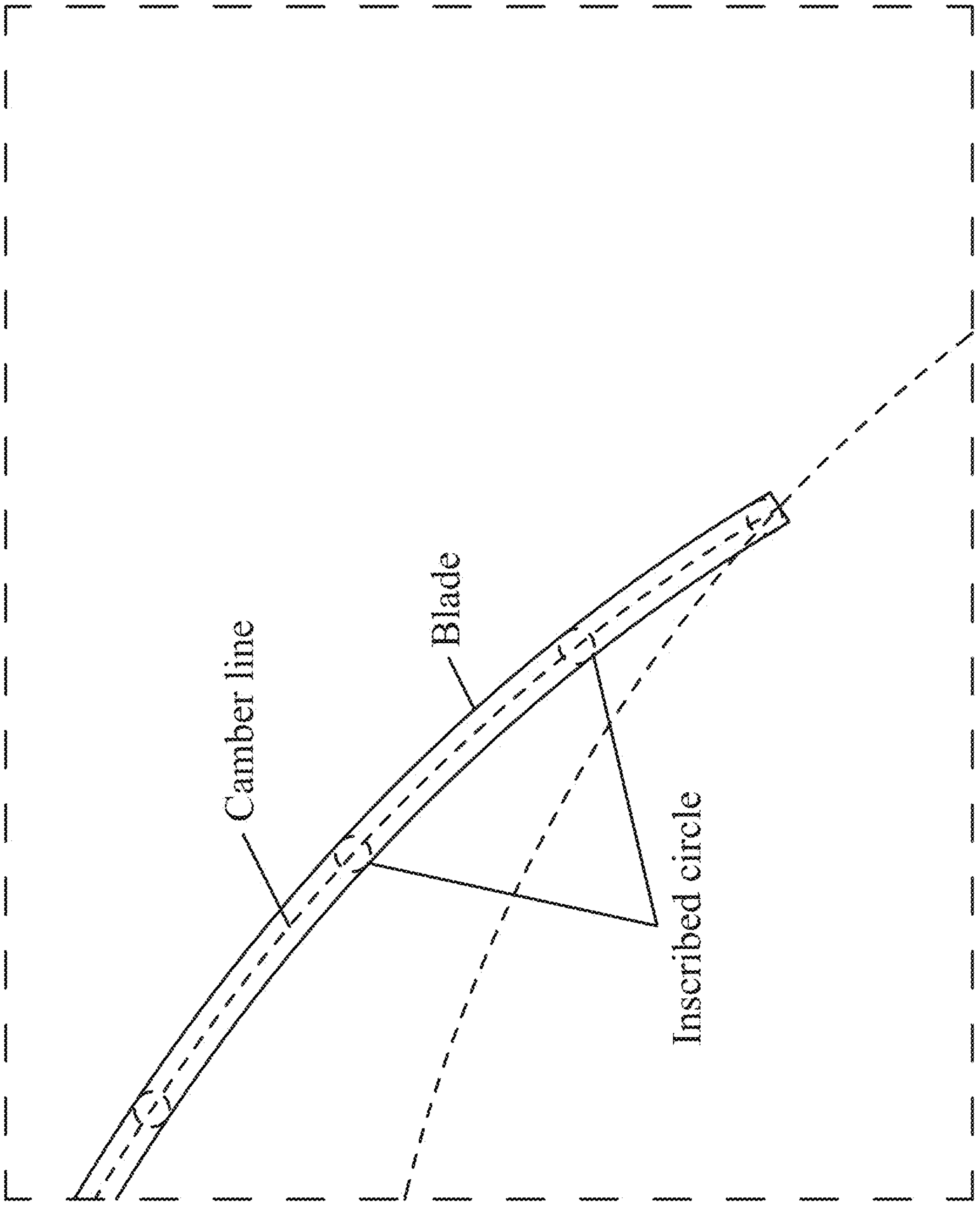
FIG. 3 (Prior art)
FIG. 3 is a local enlarged view of part A in FIG. 2.
Figure 4:
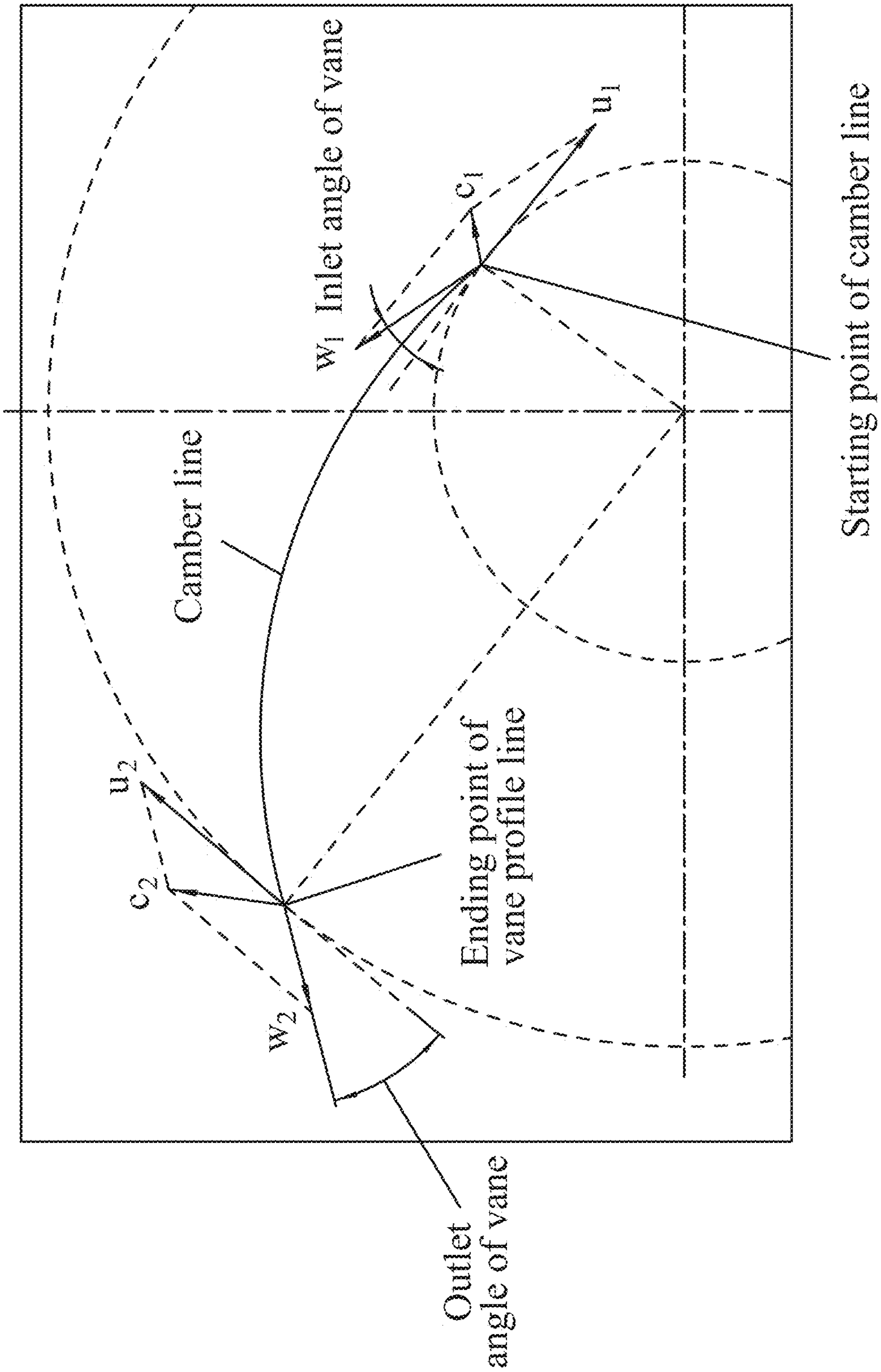
FIG. 4 (Prior art)
FIG. 4 is a schematic diagram illustrating geometric parameters of a camber line in the related art.
Figure 5:
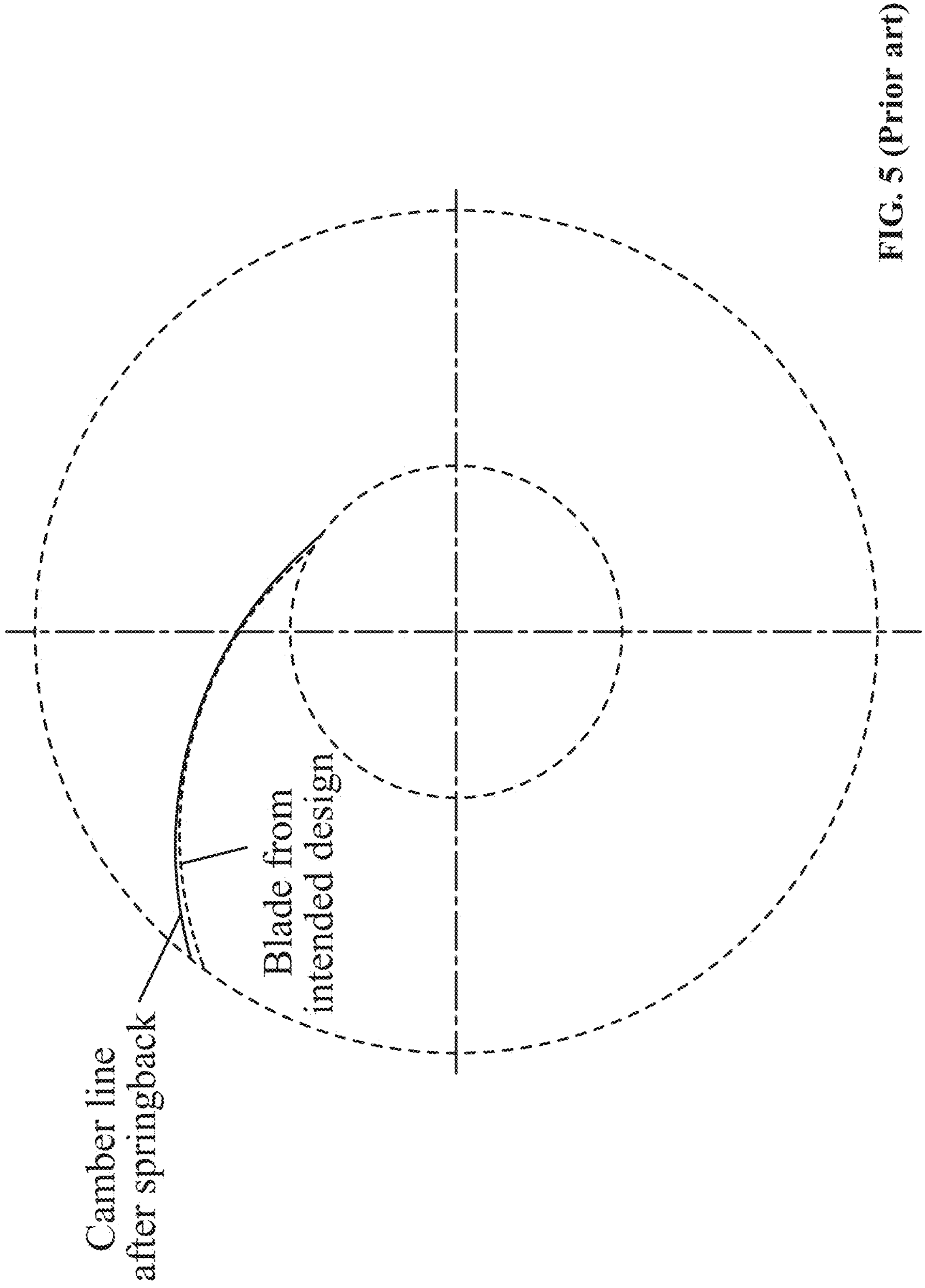
FIG. 5 (Prior art)
FIG. 5 is a comparative diagram showing a camber line after springback compared to the intended design in the related art.
Figure 6:
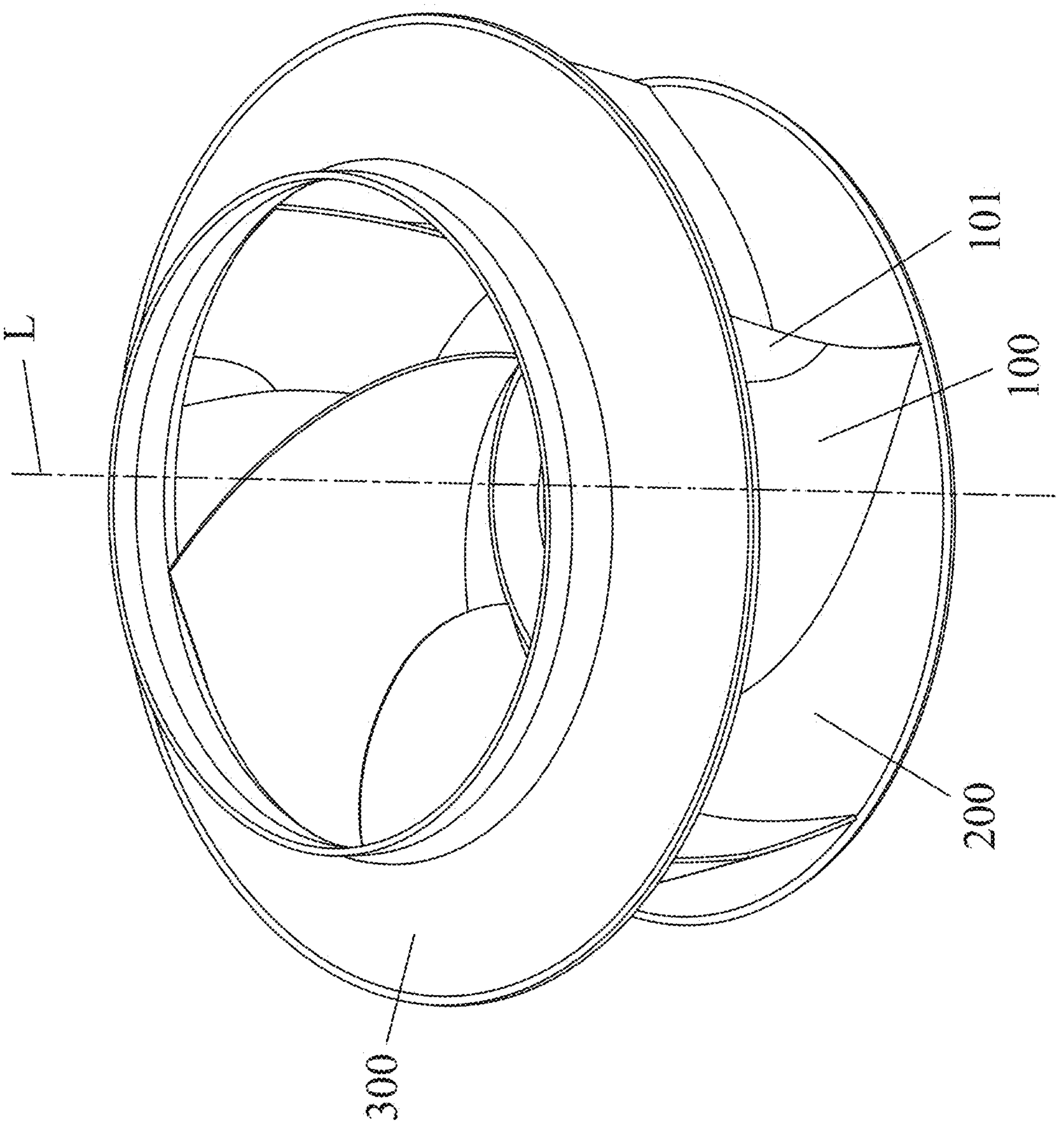
FIG. 6 is a perspective view of a centrifugal impeller according to one example of the disclosure.
Figure 7:
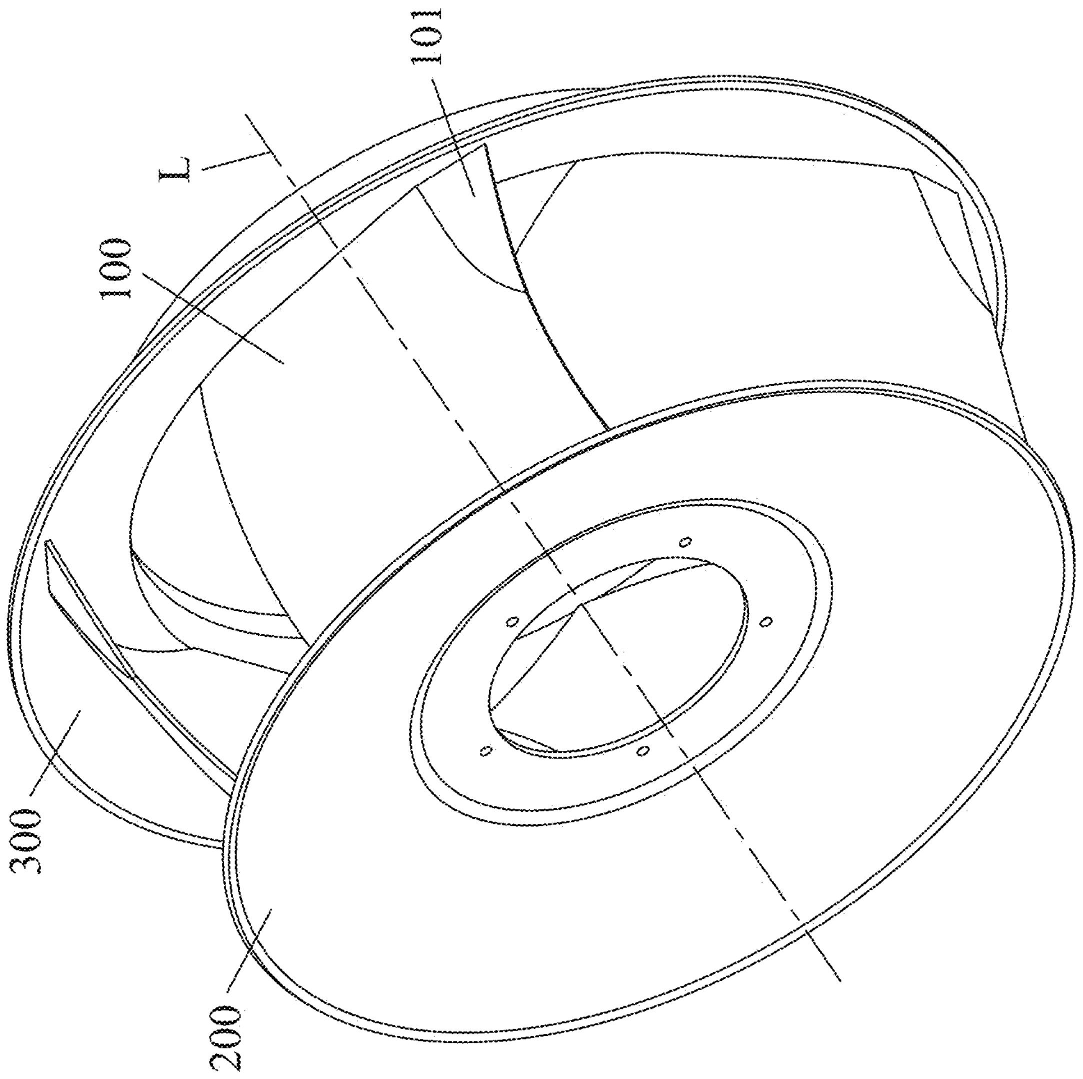
FIG. 7 is another perspective view of a centrifugal impeller according to one example of the disclosure.
Figure 8:
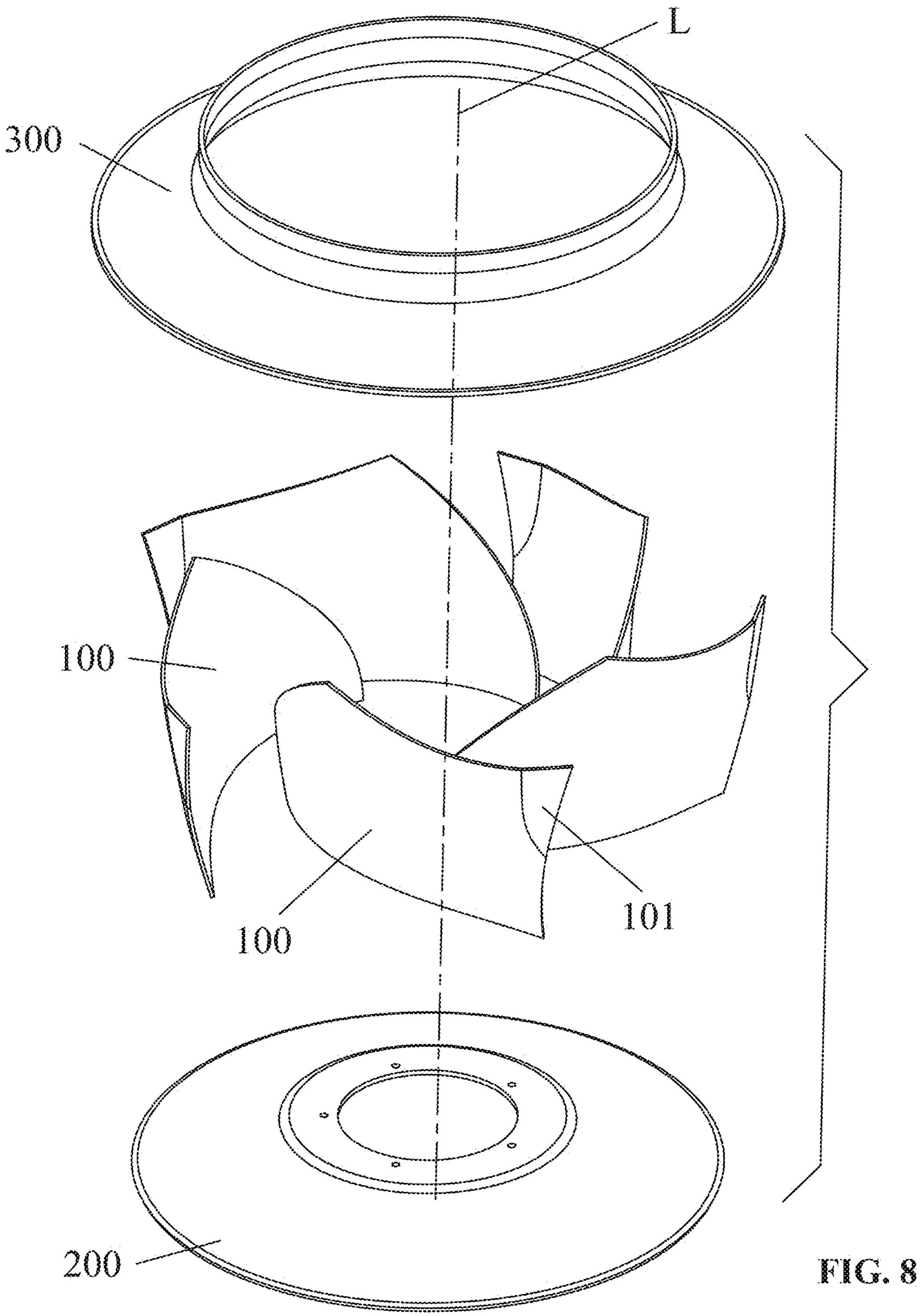
FIG. 8 is an exploded view of a centrifugal impeller according to one example of the disclosure.
Figure 9:
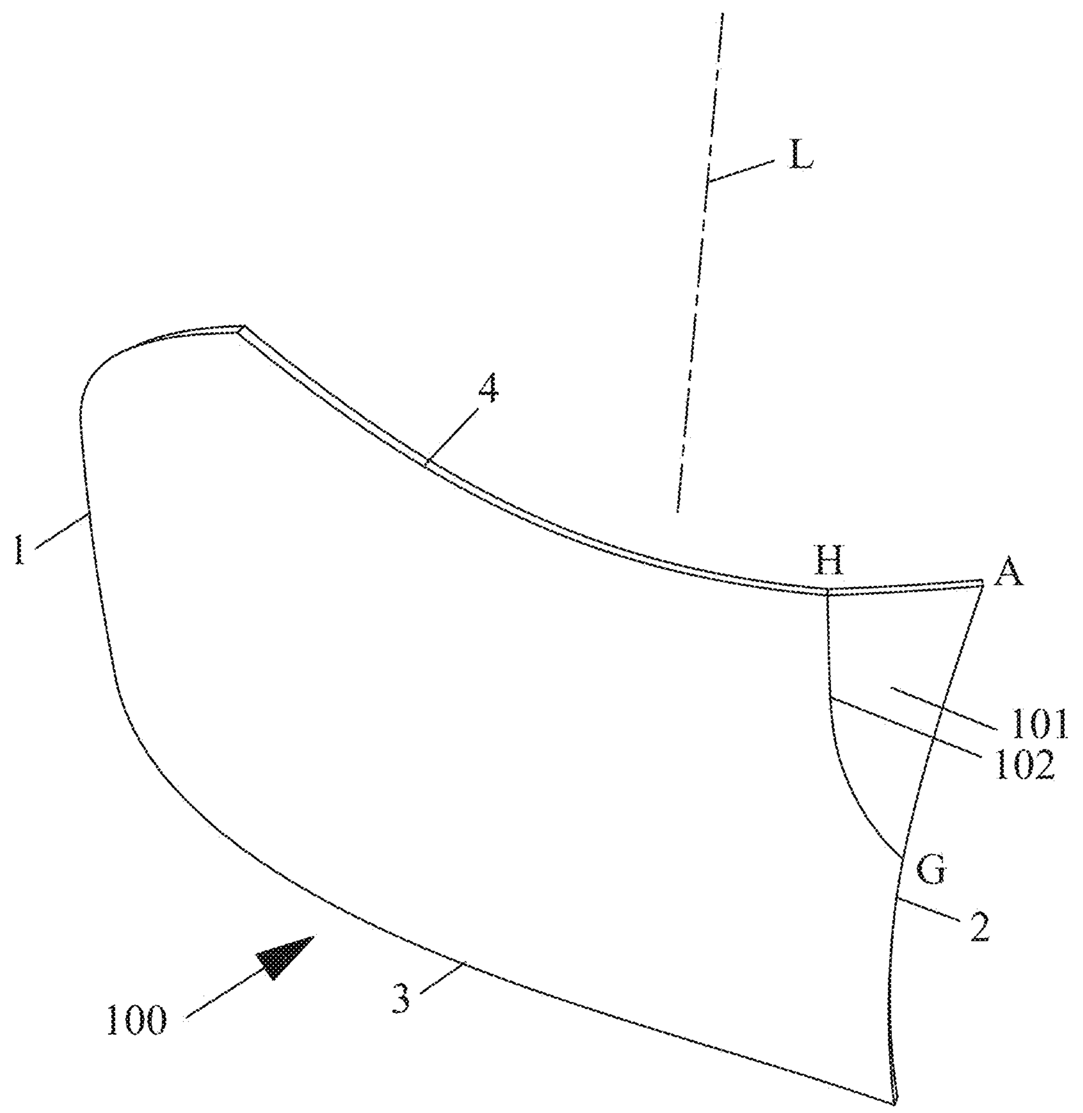
FIG. 9 is a perspective view of a curved blade according to one example of the disclosure.
Figure 10:
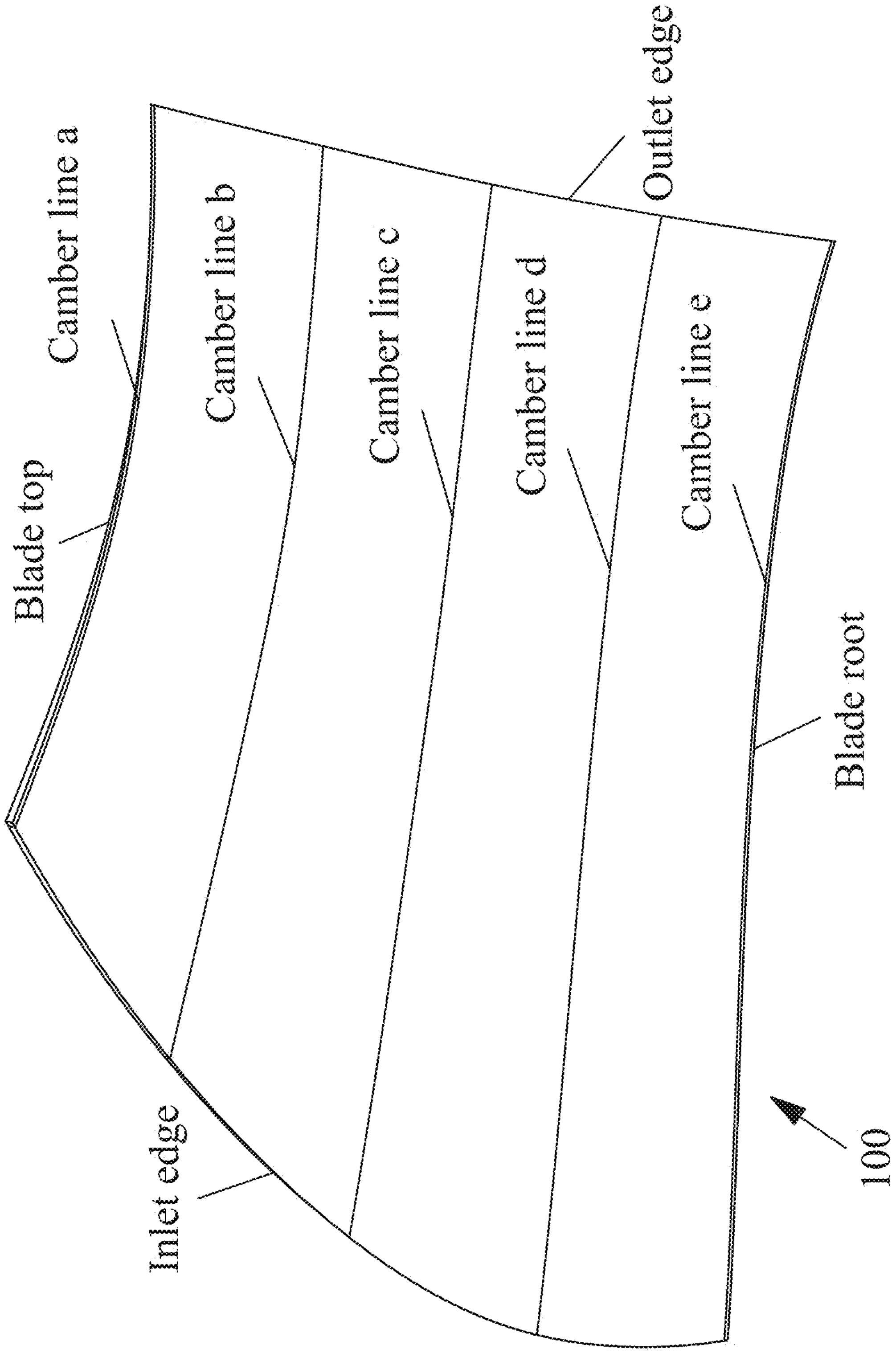
FIG. 10 is a schematic diagram of a primary blade divided into four equidistant parts according to one example of the disclosure.

As shown in FIG. 10, the primary blade 100' comprises an inlet edge 1', an outlet edge 2', a blade root 3', and a blade top 4'; the inlet edge 1' is disposed oppositely to the outlet edge 2'; the blade root 3' is disposed oppositely to the blade top 4'; the inlet edge 1' and the outlet edge 2' are each disposed between the blade root 3' and the blade top 4'; and a vertex A is defined at a joint of the outlet edge 2' and the blade top 4'. Optionally, the primary blade 100' is prepared by sheet metal stamping.

S20. Formation of a fold line GH on the primary blade

The fold line GH comprises a first point G and a second point H; the first point G is defined on the outlet edge 2'; the second point H is defined on the blade top 4'; a first curve GA is formed on the outlet edge 2' between the first point G and the vertex A; a second curve HA is formed on the blade top between the second point H and the vertex A; the first curve GA, the second curve HA, and the fold line GH enclose a bending region AGH 101.

S30. Formation of the curved blade

The bending region AGH is bent along the fold line GH towards the rotating axis L to form each of the plurality of curved blades.

In certain embodiments, in S20, the fold line GH is formed as follows:

- S20-1. the first point G is defined; a camber line through the first point G is obtained; a first line segment GY' is drawn on the tangent of the camber line passing through at the first point G; the first line segment GY' is rotated about the first point G within a normal plane of the first curve GA towards the rotating axis L by a first angle f to obtain a second line segment GY; and an endpoint Y' of the first line segment GY' is on one side of the first point G away from the inlet edge 1';
- S20-2. the second line segment GY is moved from the first point G to the vertex A, thereby generating a profile M; and
- S20-3. the profile M is rotated about the second line segment GY towards the rotating axis L by a second angle i; subsequently, the profile M is intersected with the primary blade to form an intersection curve, referred to as the fold line GH 102.

In certain embodiments, the first angle f is between 3° and 10°, and the second angle i is between 3° and 6°.

In certain embodiments, in S30, the bending region AGH 101 is bent along the fold line GH towards the rotating axis L, so as to coincide with the profile M, thereby obtaining the curved blade.

In certain embodiments, the fold line GH and the outlet edge are intersected with a plurality of camber lines, forming a plurality of curves VO; and the lengths of the plurality of curves VO increase from the point G to the vertex A.

Figure 11:
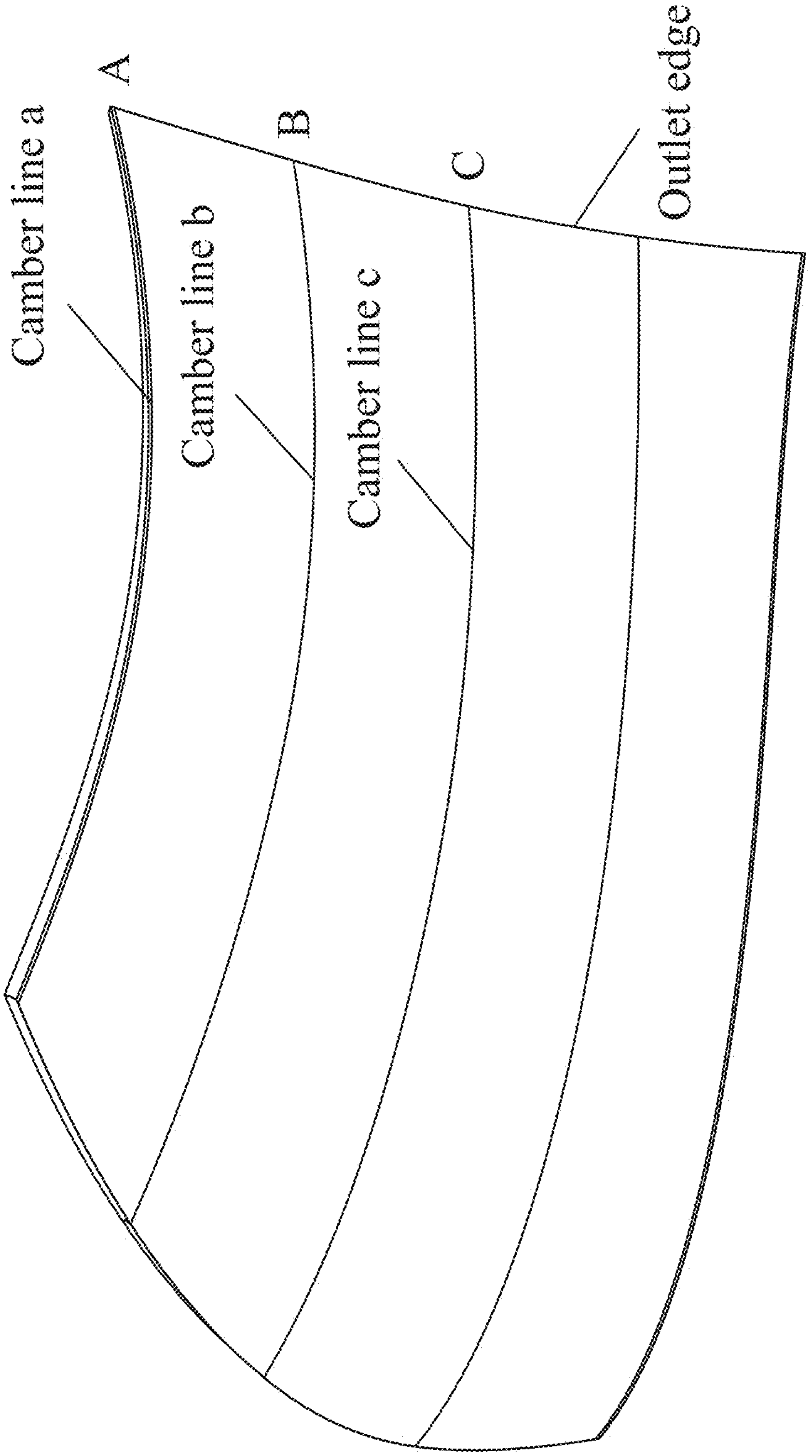
FIG. 11 is a schematic diagram showing an outlet edge in FIG. 10.
Figure 12:
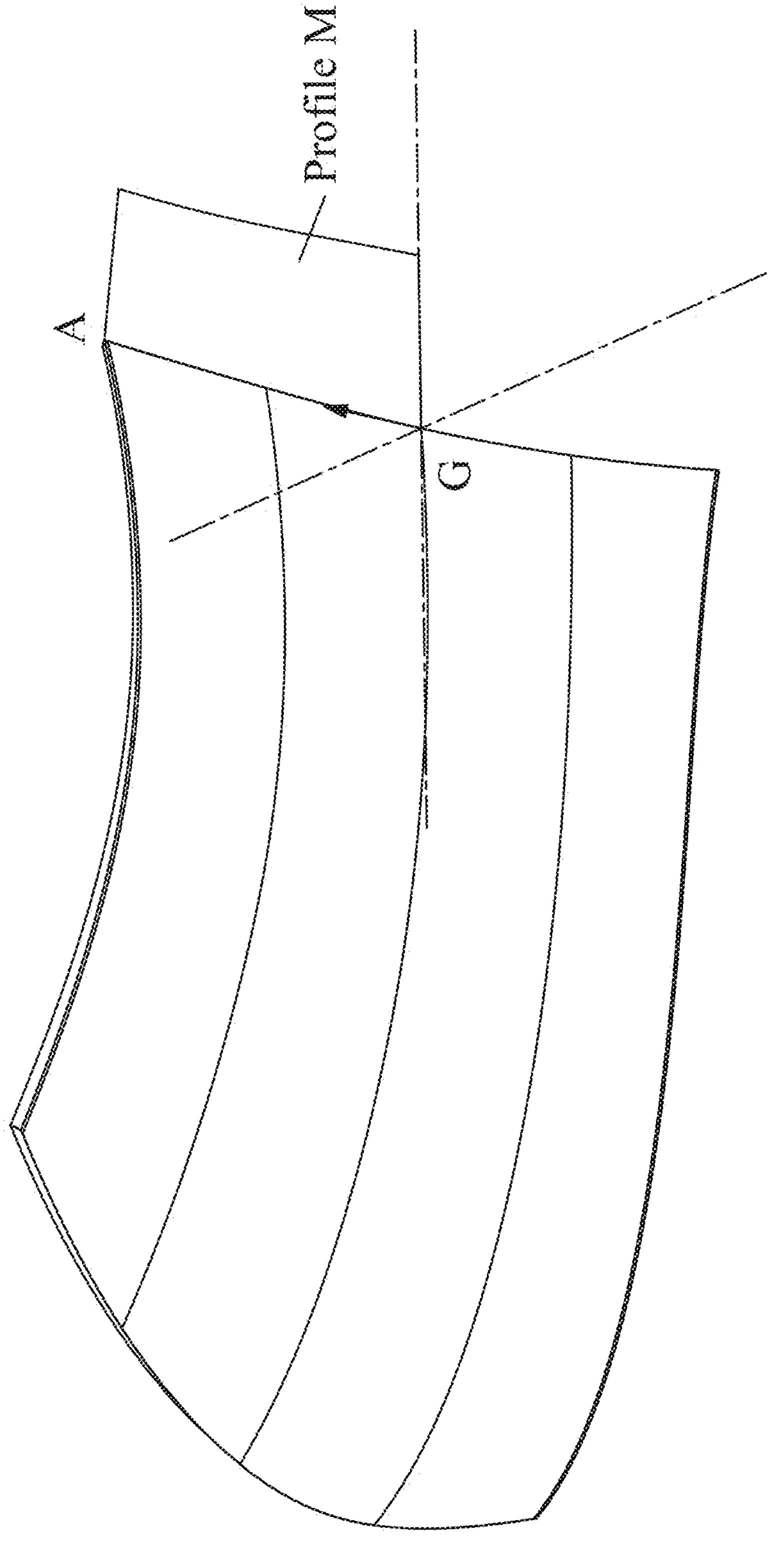
FIG. 12 is a schematic diagram showing a profile M extended from a primary blade according to one example of the disclosure.
Figure 13:
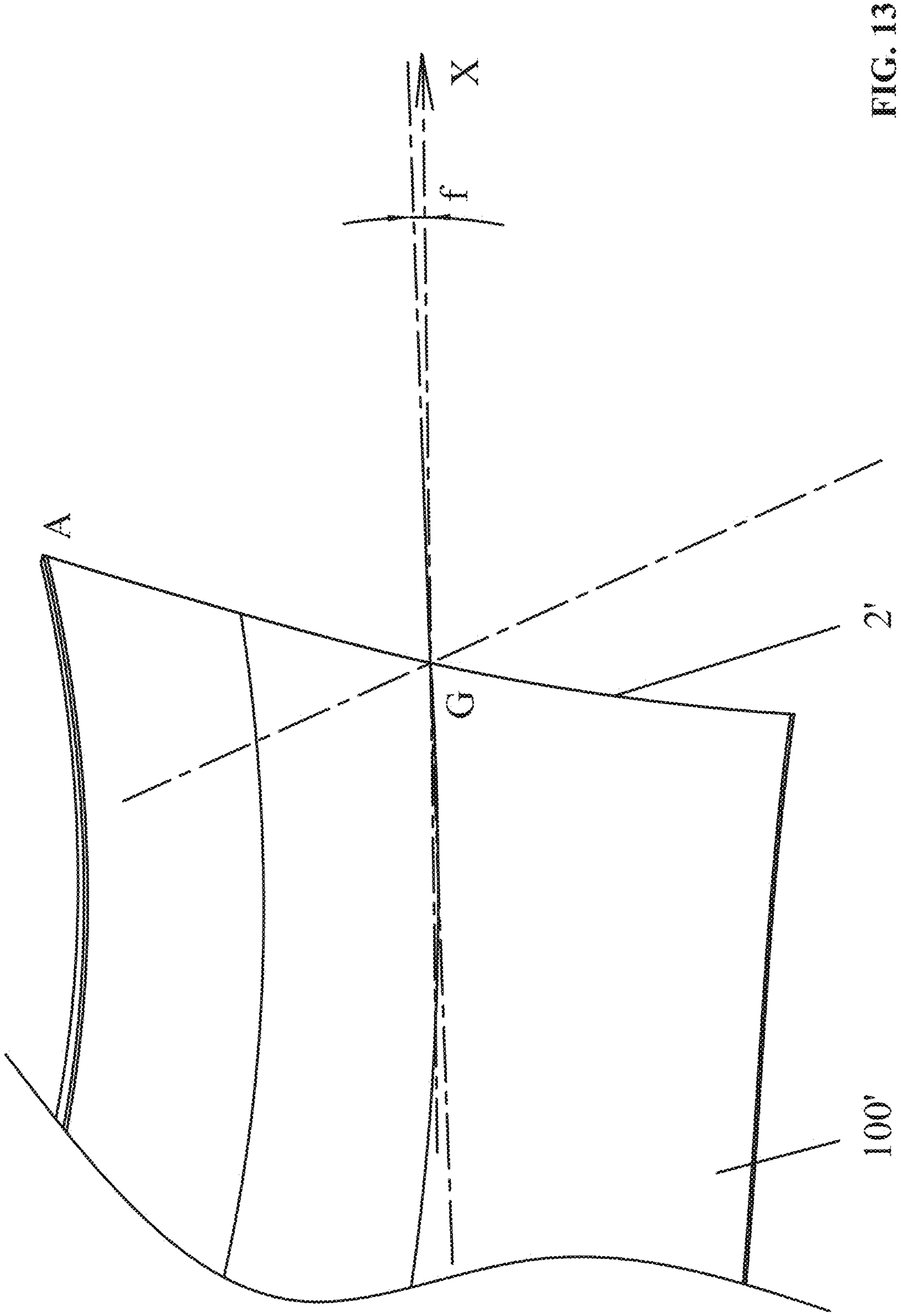
FIG. 13 is a schematic diagram showing an intersection of a point G located on a primary blade with a normal plane according to one example of the disclosure.
Figure 14:
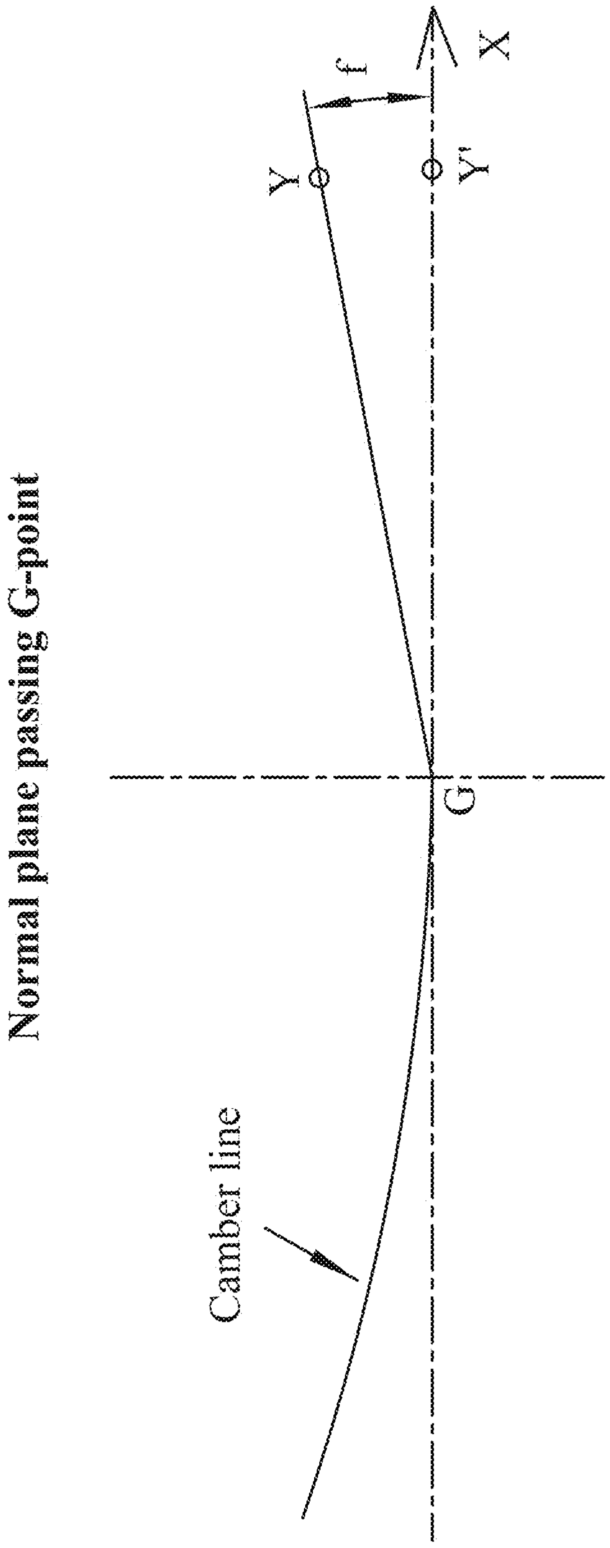
FIG. 14 is a schematic diagram showing a line segment of an intersection between a profile M passing through a point G and a normal plane according to one example of the disclosure.
Figure 15:
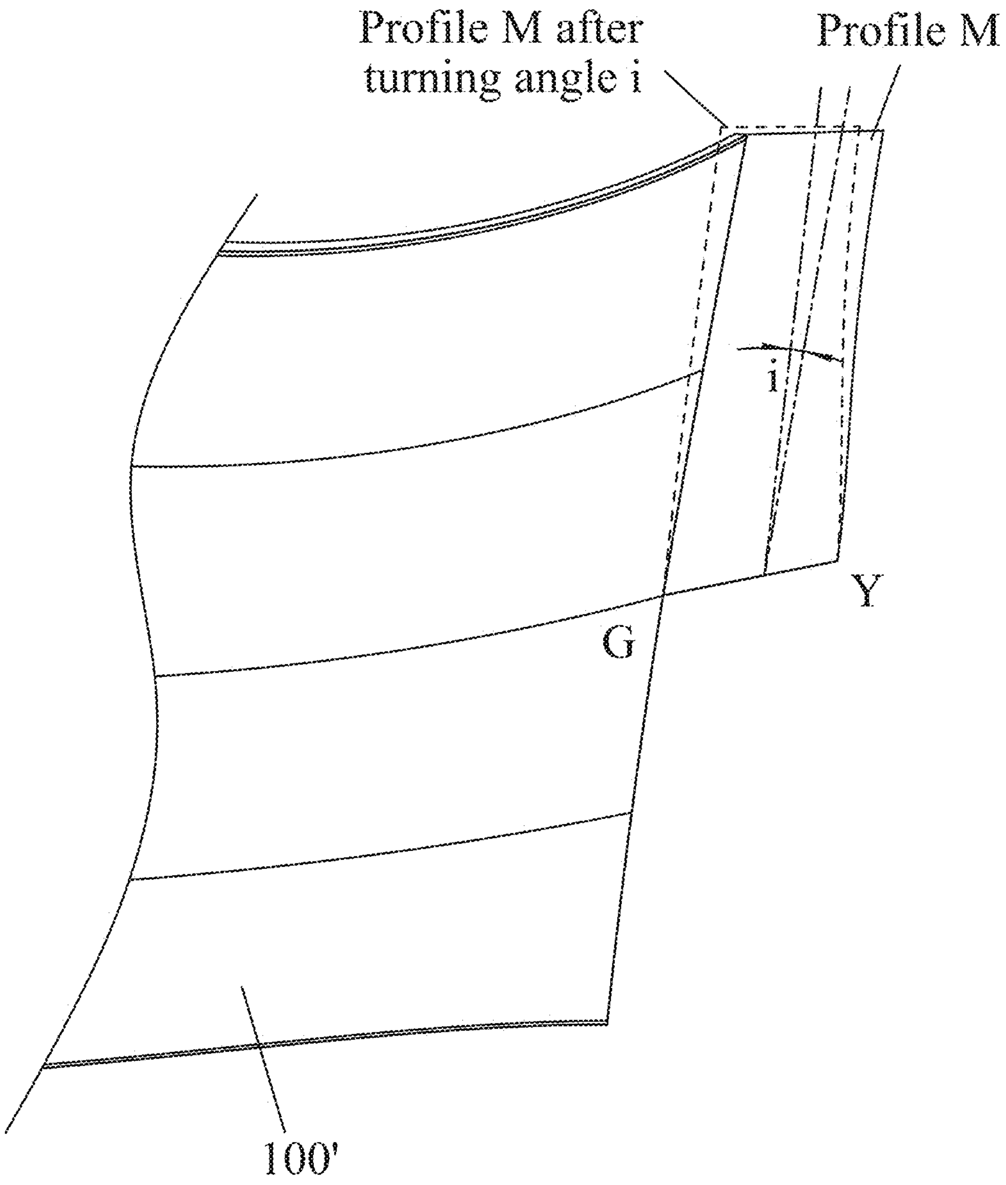
FIG. 15 is a schematic diagram showing a profile M after rotation around the second line segment GY according to one example of the disclosure.
Figure 16:
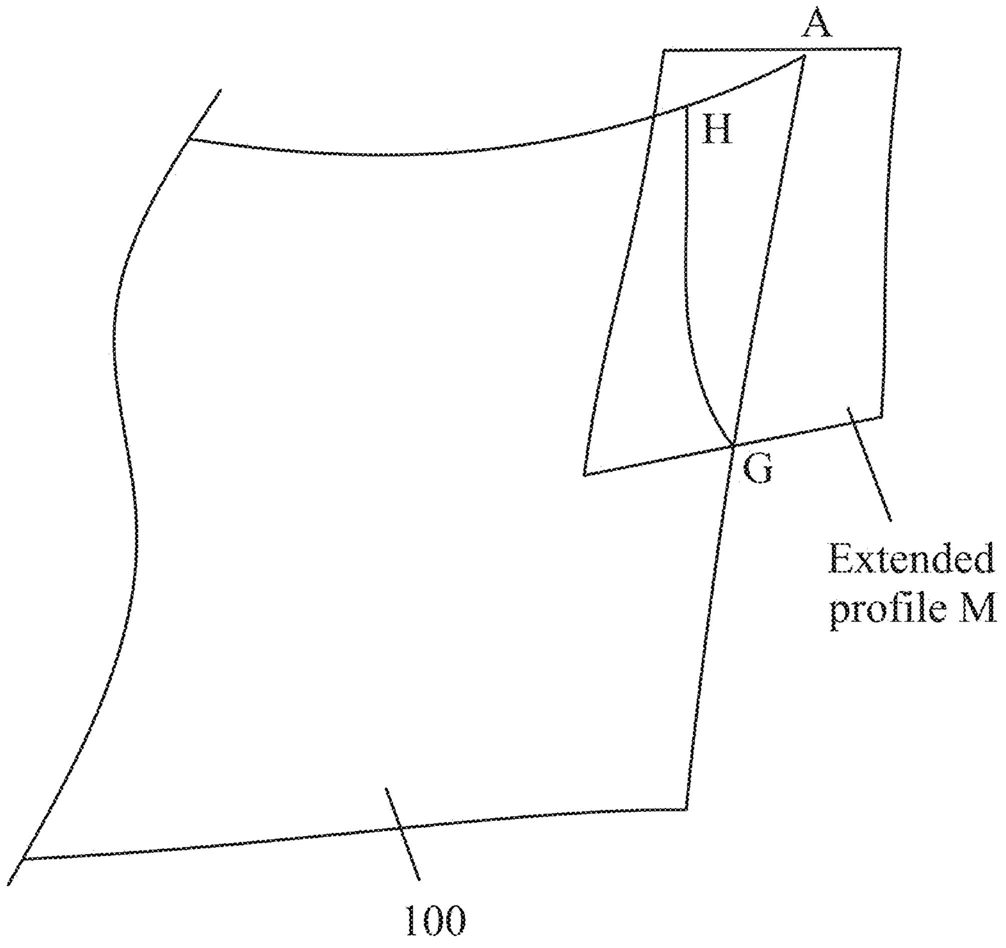
FIG. 16 is a schematic diagram showing an intersection of a primary blade with a profile M according to one example of the disclosure.

Detailed description of the bending region AGH 101 and the bending process towards the rotating axis L are as follows:

- S1: as shown in FIG. 10, each of the plurality of blades 100 is enclosed by the inlet edge 1', the outlet edge 2', the blade root 3', and the blade top 4'; from the blade top to the blade root, five camber lines are defined to divide the primary blade into four equidistant parts; the five camber lines refer to a first camber line a (located at the blade top), a second camber line b (located at one-quarter of the surface of the primary blade), a third camber line c (located at half of the surface of the primary blade), a fourth camber line d (located at three-quarter of the surface of the primary blade), and a fifth camber line e (located at the blade root); referring to FIG. 11, definitions are given below:
  - an ending point of the camber line a is located at the vertex A;
  - an ending point of the camber line b is located at point B; and
  - an ending point of the camber line c is located at point C;
- S2: a curve BC is formed from the point B to the point C; the first point G is located on the curve BC; a first curve GA is formed from the point G to the vertex A, and the profile M is drawn along the first curve GA (as described in S3); as shown in FIG. 12, the centrifugal impeller is cut by a plurality of normal planes perpendicular to the rotating axis L, so that a plurality of cross-sectional blade profiles are obtained; and each of the plurality of cross-sectional blade profiles comprises the camber line;
- S3: as shown in FIGS. 12-14, the point C is defined as the first point G; a first line segment GY' is drawn on the tangent of the third camber line c; the first line segment GY' is rotated about the first point G within a normal plane of the first curve GA towards the rotating axis L by a first angle f to obtain the second line segment GY; the first line segment GY is moved from the first point G to the vertex A, thereby generating a profile M; and
  - a tangent to the camber line at the first point G is defined as an X-axis; and the first point G is defined as an origin. Specifically, the profile M is intersected by each normal plane along the first curve GA to produce a cross-sectional shape, defined as the second line segment GY of arbitrary length; one endpoint of the second line segment GY is located at the origin; the first angle f is formed between the second line segment GY and the X-axis; in practical applications, the value of the first angle f varies according to the size of the centrifugal impeller, typically ranging from 3° to 10°;
- S4. as shown in FIG. 15, the second line segment GY is located on the profile M; the profile M is rotated around the second line segment GY towards the rotating axis L by the second angle i; the profile M is intersected with the primary blade to form an intersection curve, referred to as the fold line GH; as shown in FIG. 16, the second point H is located on the camber line a; in practical applications, the value of the second angle i varies according to the size of the centrifugal impeller, typically ranging from 3° to 6°;
- S5: as shown in FIG. 16, the bending region AGH 101 is bent along the fold line GH towards the rotating axis L, so as to coincide with the profile M, thereby obtaining the curved blade.

Figure 17:
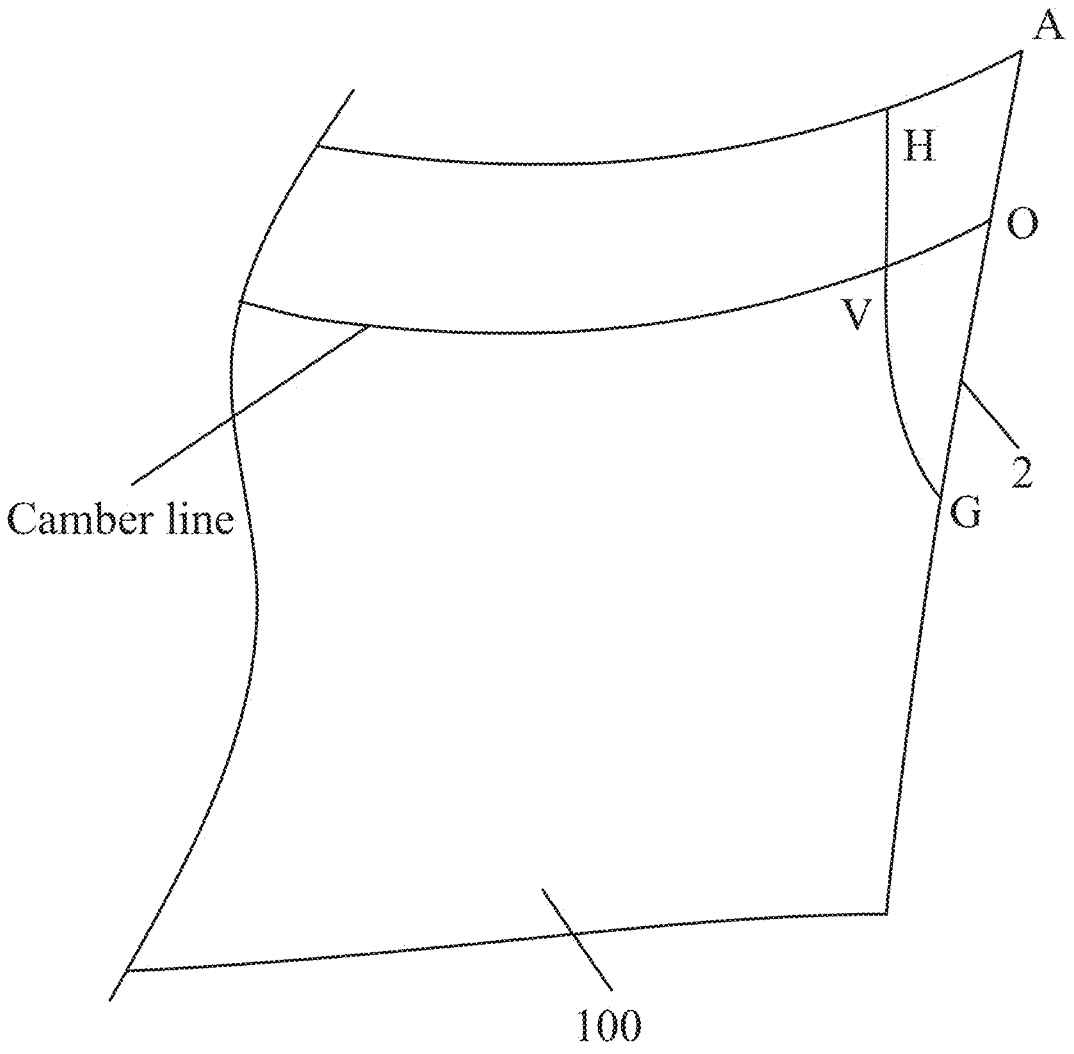
FIG. 17 is a schematic diagram showing an intersection of a camber line with a bending region AGH according to one example of the disclosure.

The disclosed method reduces the outlet angle of the bending region AGH by the first angle f. Significant blade deformation is achieved along the first curve GA thereby increasing the operating efficiency of the primary blade. The camber lines, therefore, exhibit varied bending length. Specifically, closer to the point A, where the blade deformation is greater, the bending lengths of the camber lines are longer. As shown in FIG. 17, the fold line GH and the outlet edge 2 intersect with the plurality of camber lines, forming a plurality of curves VO; the lengths of the curves VO gradually increase from the point G to the vertex A; and at the point G, the length of the curve VO is zero.

The disclosure also provides a curved blade prepared with abovementioned method. Specifically, the inlet edge 1 and the blade root 3 of the curved blade 100 is just the inlet edge 1' and the blade root 3' of the primary blade 100'. The outlet edge 2 of the curved blade 100 is originated from the outlet edge of the primary blade 100 after one corner of the primary blade 100' is bended to form the bending region, and the blade top 4 of the curved blade 100 is originated from the blade top of the primary blade 100' after the one corner of the primary blade 100' is bended to form the bending region.

1. The method stabilizes the shape of the plurality of primary blades, reducing springback caused by elastic recovery after sheet metal stamping, and minimizing the deviation from the intended blade profile.

2. The method adjusts the parameters of the starting point of the blade profile and reduces the outlet angle of the primary blades to align the outlet airflow angle of the primary blade with the intended blade profile after springback. The adjustment minimizes the deviation from the intended design specification, preventing the motor input and output from exceeding permissible limits, avoiding detrimental effects such as increased motor temperature, reduced motor output efficiency, and accelerated failure of motor components.
3. The reduces the number of mold adjustments, saving on manufacturing and mold costs, significantly increasing mold efficiency, reducing uncontrollable factors, and ensuring blade performance and on-time product delivery.

What is claimed is:

1. A method for preparing a curved blade of a centrifugal impeller, the centrifugal impeller comprising a disk and a cover, wherein the centrifugal impeller is centered around a rotating axis, the disk comprises a disk surface perpendicular to the rotating axis, and the cover comprises a cover surface perpendicular to the rotating axis; the method comprising:

S1) providing a primary blade, wherein the primary blade comprises an inlet edge, an outlet edge, a blade root, and a blade top; the inlet edge is disposed oppositely to the outlet edge; the blade root is disposed oppositely to the blade top; the blade root is adapted to be disposed along and connected to the disk surface, the blade top is adapted to disposed along and connected to the cover surface; the inlet edge and the outlet edge are disposed between the blade root and the blade top; the inlet edge is adapted to be disposed adjacent to the rotating axis with respect to the outlet edge; and a vertex is defined at a joint of the outlet edge and the blade top;

S2) forming a fold line on the primary blade, wherein the fold line comprises a first point and a second point; the first point is defined on the outlet edge; the second point is defined on the blade top; a first curve is formed on the outlet edge between the first point and the vertex; a second curve is formed on the blade top between the second point and the vertex; the first curve, the second curve, and the fold line enclose a bending region; and S3) bending the bending region along the fold line towards the rotating axis to form the curved blade, while moving the second curve of the bending region along the cover surface.

2. The method of claim 1, wherein in S2), forming a fold line on the primary blade comprises:

S2-1) defining the first point; obtaining a camber line through the first point; drawing a first line segment on a tangent of the camber line passing through at the first point; rotating the first line segment about the first point within a normal plane of the first curve towards the rotating axis by a first angle to obtain a second line segment, wherein an endpoint of the first line segment is on one side of the first point away from the inlet edge;

S2-2) moving the second line segment from the first point to the vertex, thereby generating a profile; and S2-3) rotating the profile about the second line segment towards the rotating axis by a second angle to intersect with the primary blade to form an intersection curve, referred to as the fold line.

3. The method of claim 2, wherein the first angle is between 3° and 10°.

4. The method of claim 2, wherein the second angle is between 3° and 6°.

5. The method of claim 1, wherein a length of the first curve is less than or equal to half a length of the outlet edge.

6. The method of claim 2, wherein in S3), the bending region is bent along the fold line towards the rotating axis, so as to coincide with the profile, thereby obtaining the curved blade.

7. The method of claim 1, wherein the fold line and the outlet edge are intersected with a plurality of camber lines, forming a plurality of curves; and lengths of the plurality of curves increase from the first point to the vertex.

8. The method of claim 7, wherein the primary blade is prepared by sheet metal stamping.

9. A curved blade, prepared according to the method of claim 1.

10. A centrifugal impeller, comprising a disk, a cover, and a plurality of the curved blades of claim 9, wherein the plurality of the curved blades is disposed between the disk and the cover; the disk is connected to the blade root of each of the plurality of the curved blades; and the cover is connected to the blade top of each of the plurality of the curved blades.

* * * * *